(12) United States Patent
Siembab et al.

(10) Patent No.: US 10,867,505 B2
(45) Date of Patent: *Dec. 15, 2020

(54) SURROUNDING INTELLIGENT MOTION SENSOR

(71) Applicants: Sean Michael Siembab, Bristol, RI (US); Caleb Neves, Warren, RI (US)

(72) Inventors: Sean Michael Siembab, Bristol, RI (US); Caleb Neves, Warren, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,258

(22) Filed: Aug. 28, 2019

(65) Prior Publication Data

US 2019/0392701 A1 Dec. 26, 2019

Related U.S. Application Data

(63) Continuation of application No. 15/924,075, filed on Mar. 16, 2018, now Pat. No. 10,438,477.

(51) Int. Cl.
| | |
|---|---|
| *G08B 25/01* | (2006.01) |
| *G01V 8/10* | (2006.01) |
| *G01V 8/00* | (2006.01) |
| *G01S 19/13* | (2010.01) |
| *G01P 13/00* | (2006.01) |
| *H04W 4/14* | (2009.01) |
| *H04W 4/80* | (2018.01) |

(52) U.S. Cl.
CPC ............ *G08B 25/016* (2013.01); *G01P 13/00* (2013.01); *G01S 19/13* (2013.01); *G01V 8/005* (2013.01); *G01V 8/10* (2013.01); *H04W 4/14* (2013.01); *H04W 4/80* (2018.02)

(58) Field of Classification Search
CPC ....... G08B 25/016; G01P 13/00; G01S 19/13; G01V 8/005; G01V 8/10; H04W 4/80; H04W 4/14
See application file for complete search history.

(56) References Cited

U.S. PATENT DOCUMENTS

| | | | |
|---|---|---|---|
| 8,531,526 B1 * | 9/2013 | Spence | G08B 13/19621 348/158 |
| 9,443,415 B2 * | 9/2016 | Nepo | G08B 25/001 |
| 9,697,721 B1 * | 7/2017 | Akuoku | G08B 21/0297 |
| 10,614,291 B2 * | 4/2020 | Fan | G06K 9/00906 |
| 2007/0109433 A1 * | 5/2007 | Yamada | H04N 5/369 348/294 |

(Continued)

*Primary Examiner* — Fekadeselassie Girma
(74) *Attorney, Agent, or Firm* — Barlow, Josephs & Holmes, Ltd.

(57) ABSTRACT

A wearable proximity warning device called SIMS (Surrounding Intelligent Motion Sensor) is provided that uses a novel method of processing images from a high frame rate digital camera to detect human threats from behind and determine if there are any approaching threats by using novel pixel counting and threat detection analysis algorithms. The device is worn on the back of the body either by use of a belt clip or with chest straps. The user may use select from a variety of warning options from the device including audible warning tones, device vibration or smartphone SMS/MMS text messaging. Stored video is saved by the SIMS device and may be periodically uploaded to secure cloud storage. The device contains a rechargeable battery that may be recharged using a USB port.

19 Claims, 15 Drawing Sheets

(56) References Cited

U.S. PATENT DOCUMENTS

| | | | |
|---|---|---|---|
| 2012/0262553 A1* | 10/2012 | Chen | H04N 13/254 |
| | | | 348/47 |
| 2013/0258162 A1 | 10/2013 | Tomioka | |
| 2015/0172545 A1 | 6/2015 | Szabo et al. | |
| 2016/0182468 A1* | 6/2016 | Johnston | H04L 9/083 |
| | | | 713/153 |
| 2016/0187022 A1* | 6/2016 | Miwa | G01V 8/10 |
| | | | 250/349 |
| 2016/0202678 A1* | 7/2016 | Aggarwal | G08B 13/19604 |
| | | | 700/275 |
| 2016/0292997 A1 | 10/2016 | Milne | |
| 2017/0032646 A1 | 2/2017 | Alameh et al. | |
| 2017/0108878 A1 | 4/2017 | Krispin | |
| 2017/0168134 A1* | 6/2017 | Jenwatanavet | H04W 4/80 |
| 2017/0263107 A1* | 9/2017 | Doyle | G08B 25/016 |
| 2018/0293892 A1* | 10/2018 | Lai | G01C 21/30 |
| 2019/0104246 A1* | 4/2019 | Antretter | G03B 15/05 |
| 2019/0129134 A1* | 5/2019 | Chino | G03B 3/10 |
| 2019/0287382 A1* | 9/2019 | Siembab | G08B 13/19613 |
| 2020/0045242 A1* | 2/2020 | Funagi | G06K 9/00718 |

* cited by examiner

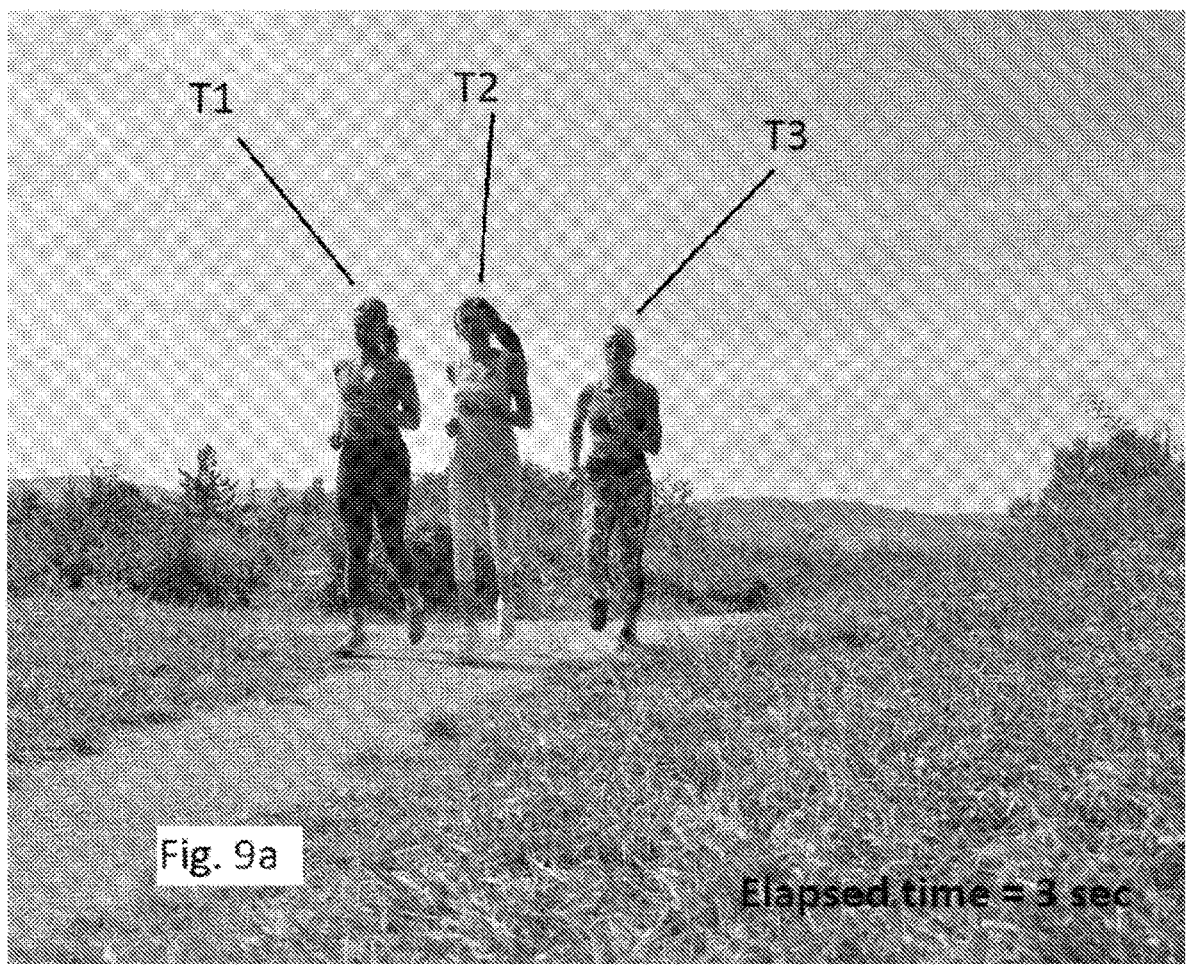

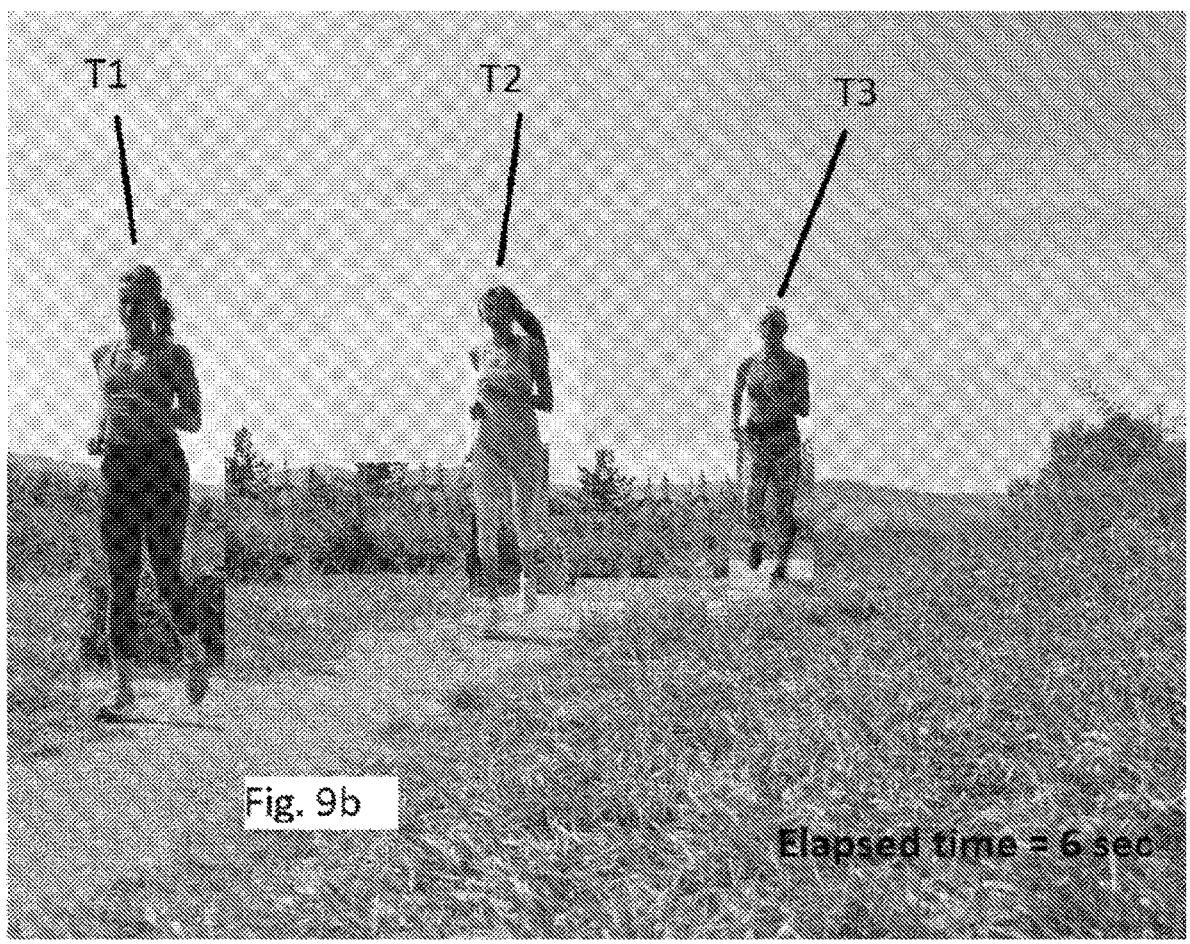

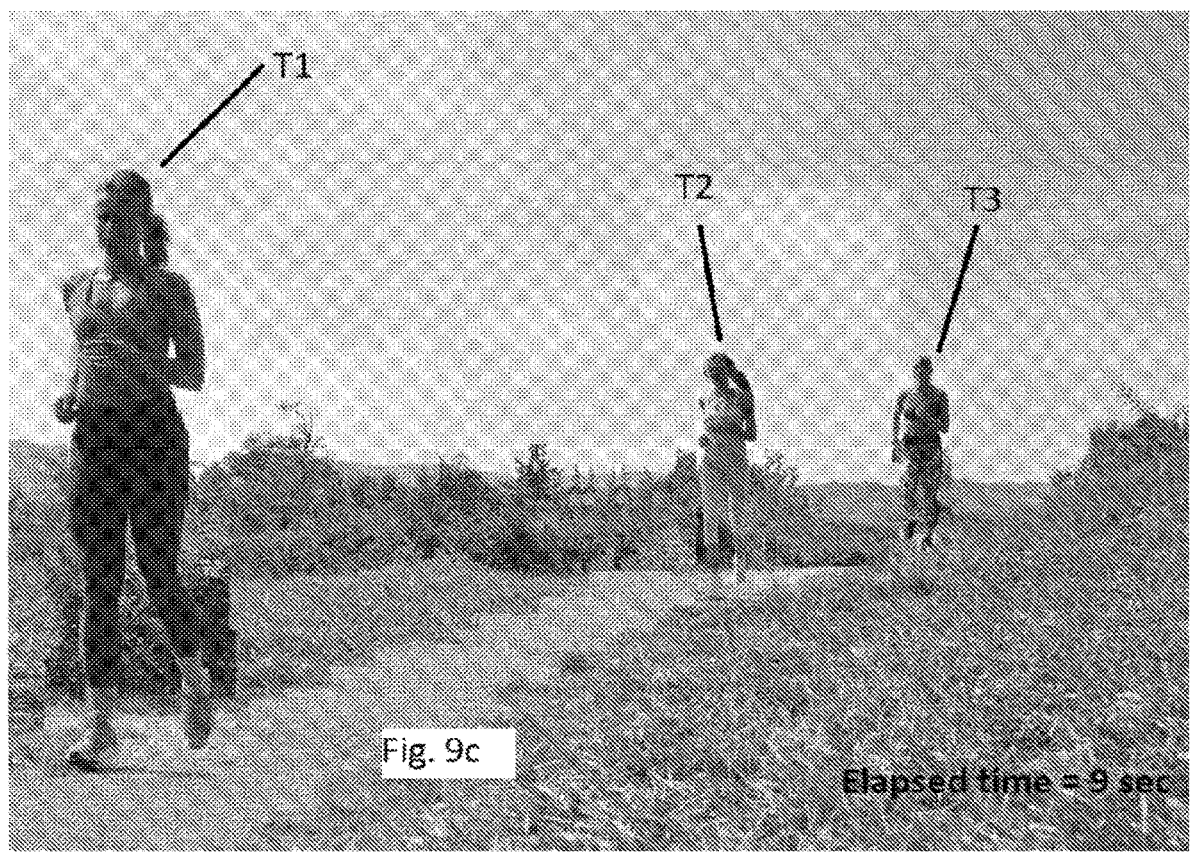

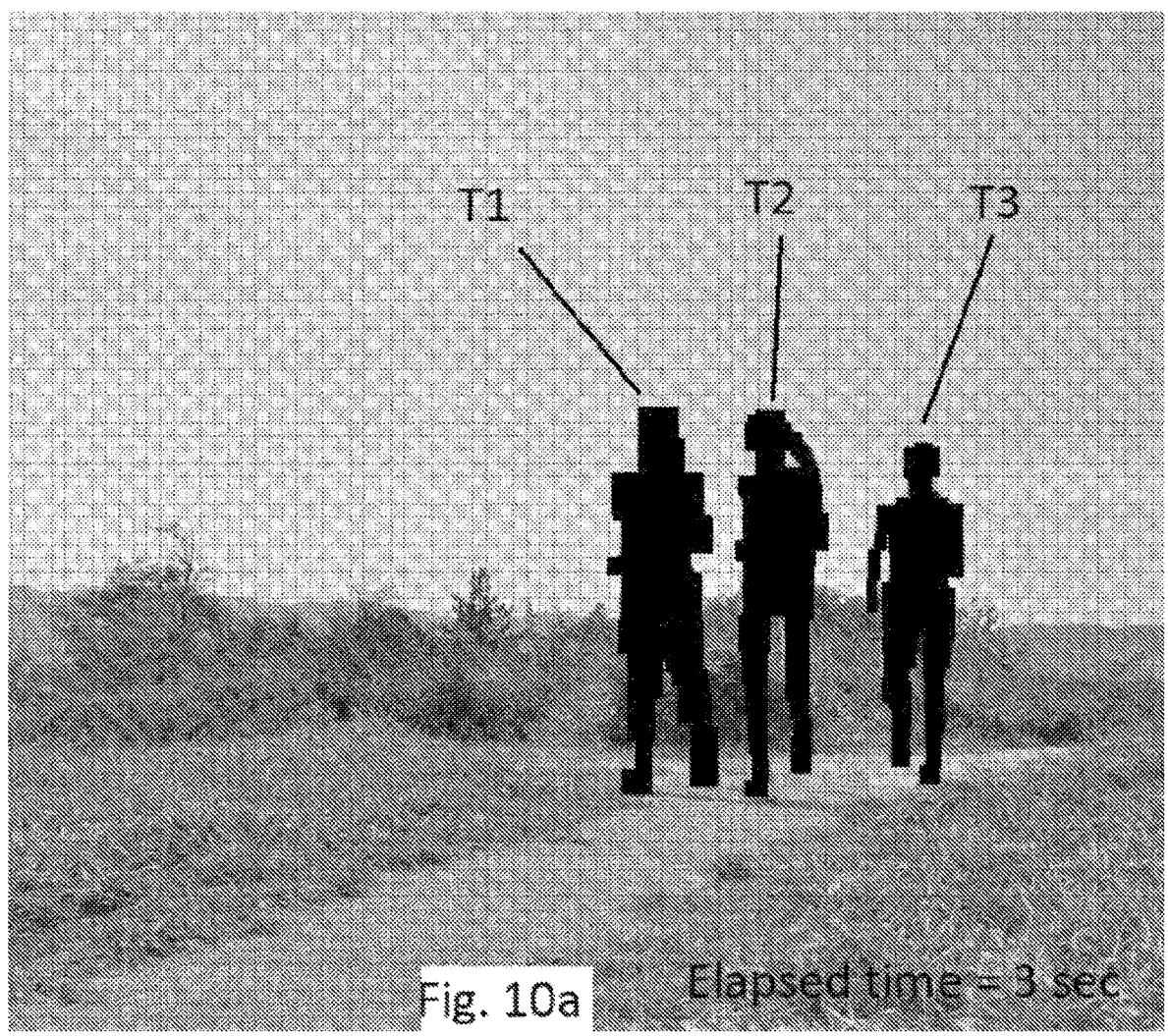

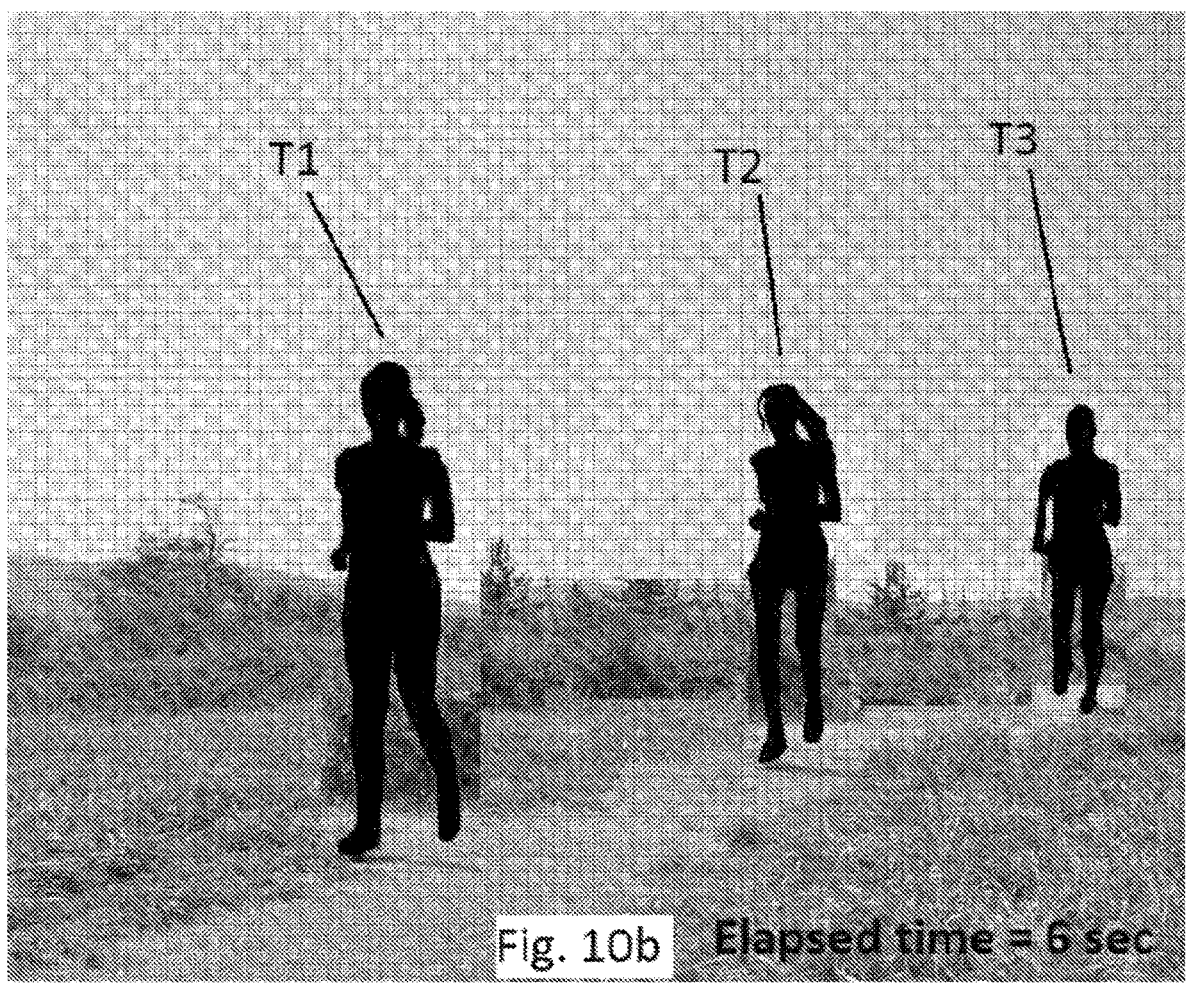

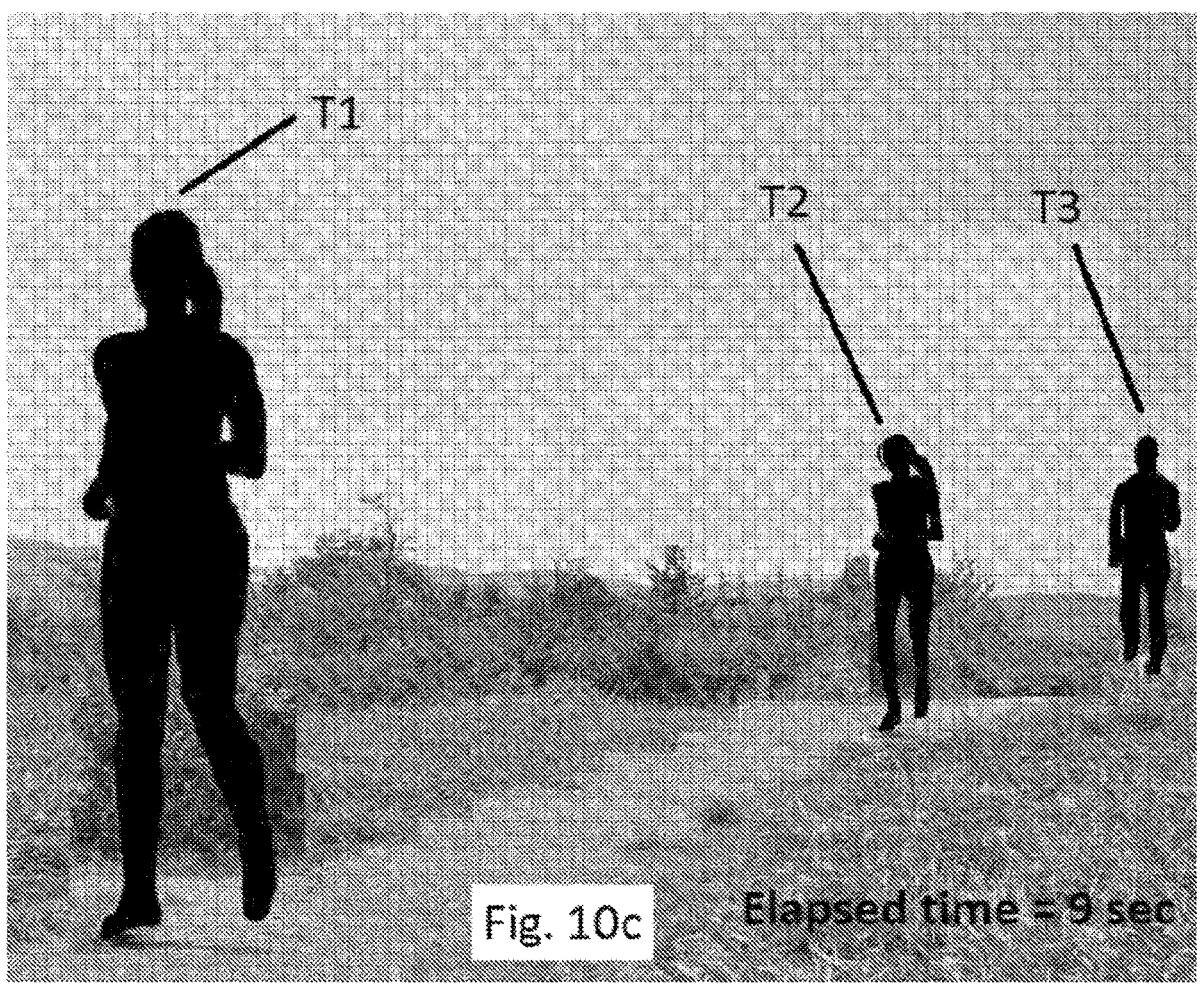

Human to Pixel Count Conversion (HPC) Algorithm
Change of Pixel Counts vs. Elapsed Time

| Elapsed Time (sec) | T1 | T2 | T3 |
|---|---|---|---|
| 3 sec | 1000 | 900 | 850 |
| 6 sec | 1500 | 890 | 800 |
| 9 sec | 3000 | 700 | 750 |
| Result | threat | no threat | no threat | of Pixels Counted for Detected Humans

Fig. 11

SURROUNDING INTELLIGENT MOTION SENSOR

CROSS REFERENCE TO RELATED APPLICATIONS

This application is a CONTINUATION of and claims priority to patent application Ser. No. 15/924,075, filed Mar. 16, 2018.

STATEMENT REGARDING GOVERNMENT INTEREST

None.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION BY REFERENCE OF MATERIAL SUBMITTED ON A COMPACT DISC OR AS A TEXT FILE VIA THE OFFICE ELECTRONIC FILING SYSTEM

None.

STATEMENT REGARDING PRIOR DISCLOSURES BY THE INVENTOR OR A JOINT INVENTOR

None.

BACKGROUND OF THE INVENTION

The present invention relates to the field of proximity detection devices, and more specifically to a wearable proximity detection device and a novel method of providing situational awareness and warning to the user of approaching threats from behind the user. There are currently over 500,000 correctional officers in the US with over 13,000 assaults per year. Unfortunately, there are currently no products available to help corrections officer professionals reduce their risk of being assaulted from inmates who are approaching them from behind. Besides correctional officers there are many other user groups who could benefit from a device to warn of a threat approaching from behind such as police officers, military personnel, and even civilian users such as joggers and runners for example.

There are several proximity detection devices discussed in the prior art. As a first example, U.S. Pat. Appl. Pub. No. 2015/0172545 published in June 2015 by Szabo et al entitled "Situational Awareness by Compressed Display of Panoramic Views" discloses a device that stitches video images from a camera to provide a 360 panoramic view of the surroundings to provide situational awareness. The Szabo device is a head mounted device intended for military and firefighters to wear on duty. Although the Szabo device could be used effectively for military and firefighting applications, it would be much too expensive for the average civilian to afford due to the complex array of imaging sensors and image processing hardware required.

A second example is U.S. Pat. Appl. Pub. No. 2017/0263107 published in September 2017 by Doyle et al entitled "Approaching Proximity Warning System, Apparatus and Method" discloses a wearable device that alerts the user of threats approaching from behind. The Doyle device uses short range radar to transmit and receive electromagnetic waves that bounce off of objects and processes the radar information using an algorithm to determine if there is an approaching threat from behind. The Doyle device is meant to be worn on the back of the user and will warn the user by various means such as by an audible signal or a mechanical signal such as by vibration of the device.

There are several inherent design flaws in the Doyle device that are addressed in the present invention. The first flaw inherent design flaw in the Doyle device is that it uses short range radar technology which has typically a maximum effective range of only 100 meters (328 feet). The patent pending device of Doyle and Cleghorn is disclosed on the internet by a New Mexico company known as DefendSix (www.defendsix.com). The DefendSix website product specification lists the detection range as approximately 25 meters (82 feet). With such as short detection range, there is a very high risk that the user of a DefendSix device may not have enough warning time to take evasive action if a threat such as a running person is approaching from behind. For example, based on a typical human running speed of 15 mph (22 feet per second), the Doyle device would first alert a static user when the person was 82 feet behind him. This would give the user only 3.7 seconds to take evasive action before the person contacts him if the user was standing still. Although a running user would have a few more seconds based on their speed differential, the point to be made is that the very limited range of the Doyle device leaves a very short time to take evasive action before the threat has reached the user.

The second inherent design flaw in the Doyle device is that because it uses radar it cannot discriminate a real threat from a false positive threat. For example, a bird flying towards the user will generate a warning to the user just like a person with a knife running from behind would. Although the radar would likely always warn the user once the 82 foot detection range is reached, the user over time would likely receive so many false positive warnings that he would start becoming disappointed with its effectiveness and basic lack of intelligence of the device.

Yet another inherent design flaw in the Doyle device is that its probability of detecting a target is based on a property of an object known as its radar cross section. The radar cross section of an object depends on many variables such as the object's size, surface area, shape and material. While some objects such as a large jogger running straight at a person from behind may have a large enough radar cross section for the device to warn the user, a small object such as a thrown baseball or a bicyclist might have too small of a radar cross section to reach the detection threshold depending on its distance from the radar.

Because the Doyle device uses low power short range radar, the variable nature of radar cross sections will likely result in either some threats not being picked up the device or being picked up approaching too close to the user to safely take evasive action. Indeed, there is a great unfilled need to supply corrections officers, police officers, military personnel and security concerned civilians with a proximity warning device that can reliably pick up targets several hundred feet away.

SUMMARY OF THE INVENTION

The present invention provides a wearable proximity warning device and novel threat detection method that resolves the aforementioned problems in the prior art by using a high frame rate digital camera with advanced image processing algorithms to detect threats from several hundred feet away and track them in real time and immediately warn the user if any threats are approaching him from behind. The present invention shall be referred to throughout the remainder of this specification as SIMS—Surrounding Intelligent Motion Sensor.

It is a first object of SIMS to provide a compact, lightweight proximity warning device that can detect threats approaching from behind at a maximum distance of 500 feet. This is well beyond the typical range of non-optical methods such as short range radar (max. detection range is—330 feet). [0009] It is a second object of SIMS to provide a threat detection capability that uses human recognition software to identify potential threats and image processing software to determine if any potential threats are approaching from behind.

It is a third object of SIMS to provide the user with multiple warning options for when an approaching threat has been detected including audible tones, vibration and Bluetooth based secure cellular phone SMS text messages or video snapshots.

It is a fourth object of SIMS to store recorded video on the cloud for secure data storage.

It is a fifth object of SIMS to allow the device to be attached to the body either by using a chest belt or by a belt clip.

It is a sixth object of SIMS to provide the wearable device with a USB rechargeable battery that provides at least six hours of continuous usage.

BRIEF DESCRIPTION OF THE DRAWINGS

FIGS. 9(a)-9(c) show a sequence of time elapsed images of running joggers to demonstrate the capability of SIMS to detect humans using a human recognition detection algorithm.

FIGS. 10(a)-10(c) show the capability of a human to pixel count conversion algorithm to count pixels of the detected humans from previous FIGS. 9(a)-9(c).

FIG. 11 is a table showing the results of the threat detection algorithm to detect an approaching threat by an increasing pixel count of detected human T1.

DETAILED DESCRIPTION

Figure 1:
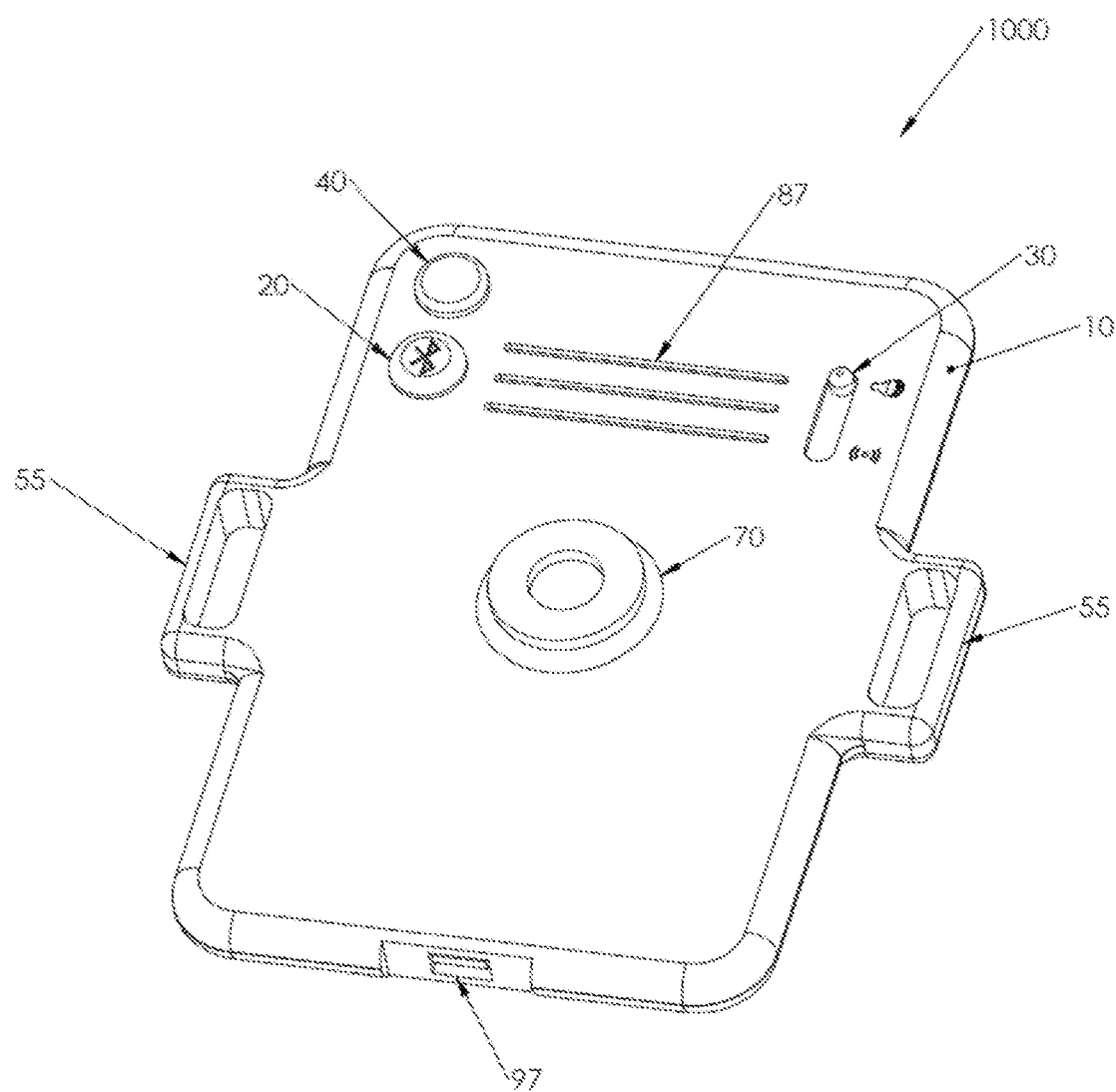
FIG. 1 is a front view of the SIMS device.

Referring now to the drawings and in particular FIG. 1, the present invention is designated by reference numeral 1000 and shall be referred to hereafter as the SIMS device. The SIMS device has a front housing 10 that is preferably made from a strong plastic such as ABS or nylon. A digital camera lens 70 is located in the center of the housing and has the typical features of modern digital cameras including a focusing capability and an adjustable aperture to adjust the brightness of the image. A USB port 97 is located at the bottom end of the SIMS device and provides a means for the recharging of an internal rechargeable battery 99 (not shown).

Referring again to FIG. 1, there are two belt or strap attachment points 55, one on each side of front housing 10. These attachment points allow for a belt or strap to be secured to them as one method of wearing the SIMS device on the body. A power on/off button 40 is shown located at the upper left hand corner of the SIMS device and provides a means to turn SIMS on or off. A Bluetooth activation button 20 is located below the power button 40 and when this button is pressed it will enable the SIMS device to use Bluetooth cellular phone warning options that shall be explained later in the specification. The SIMS device can provide either an audible tone warning or a vibration warning depending on which position the warning mode selector switch 30 is in. For example, in FIG. 1, the mode selector switch 30 is shown in the audible tone warning position. When the audible tone warning mode is selected, an internal speaker 85 (not shown) will produce sound that will be emanated from speaker holes 87 shown in the top center section of the SIMS device.

Figure 2:
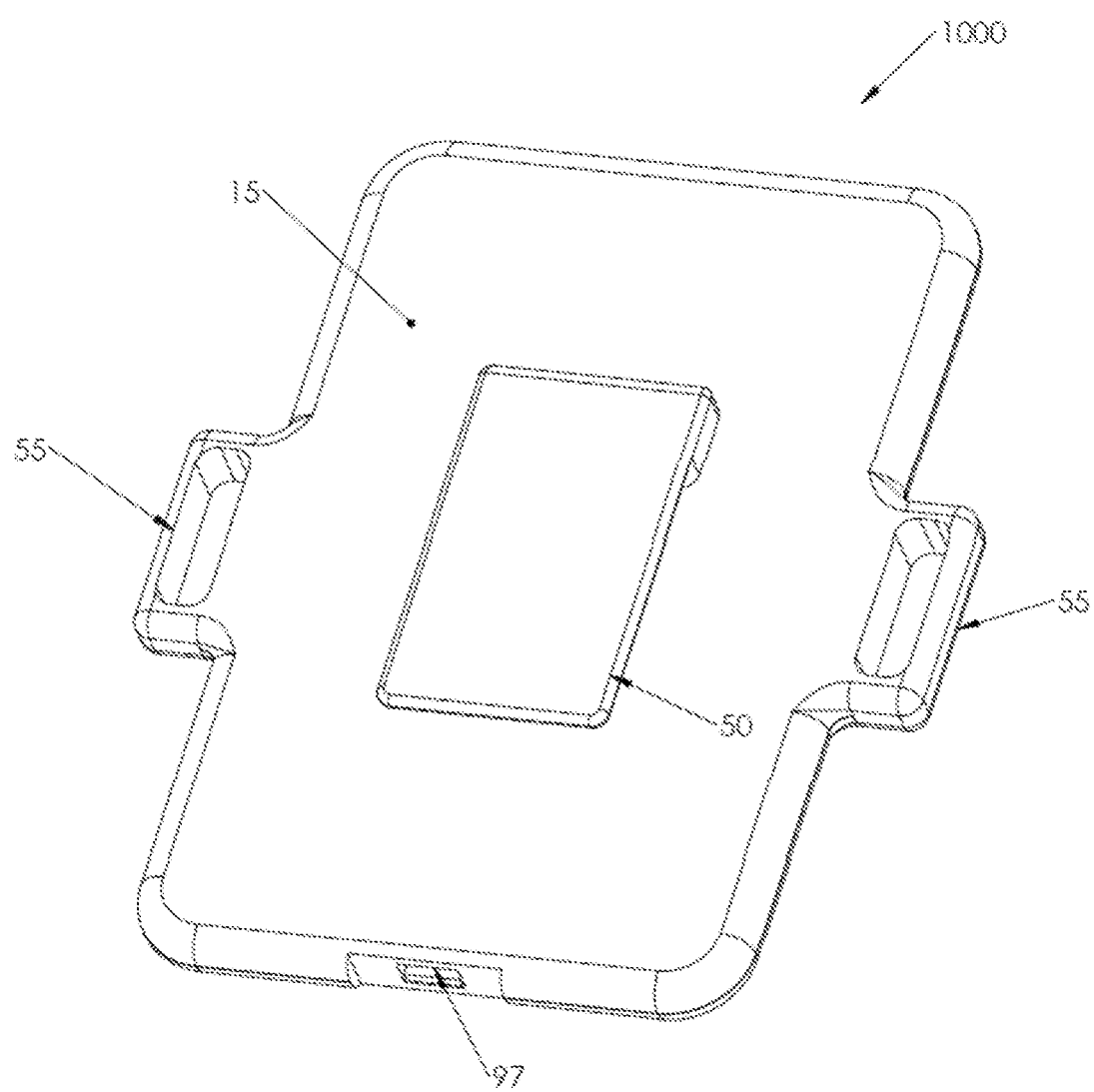
FIG. 2 is a rear view of the SIMS device.

Referring next to FIG. 2, the back side of the SIMS device 1000 is shown. A belt clip 50 is shown centered on the rear housing 15 of the SIMS device. The belt clip 50 provides an additional means of wearing the SIMS device on the body.

Figure 3:
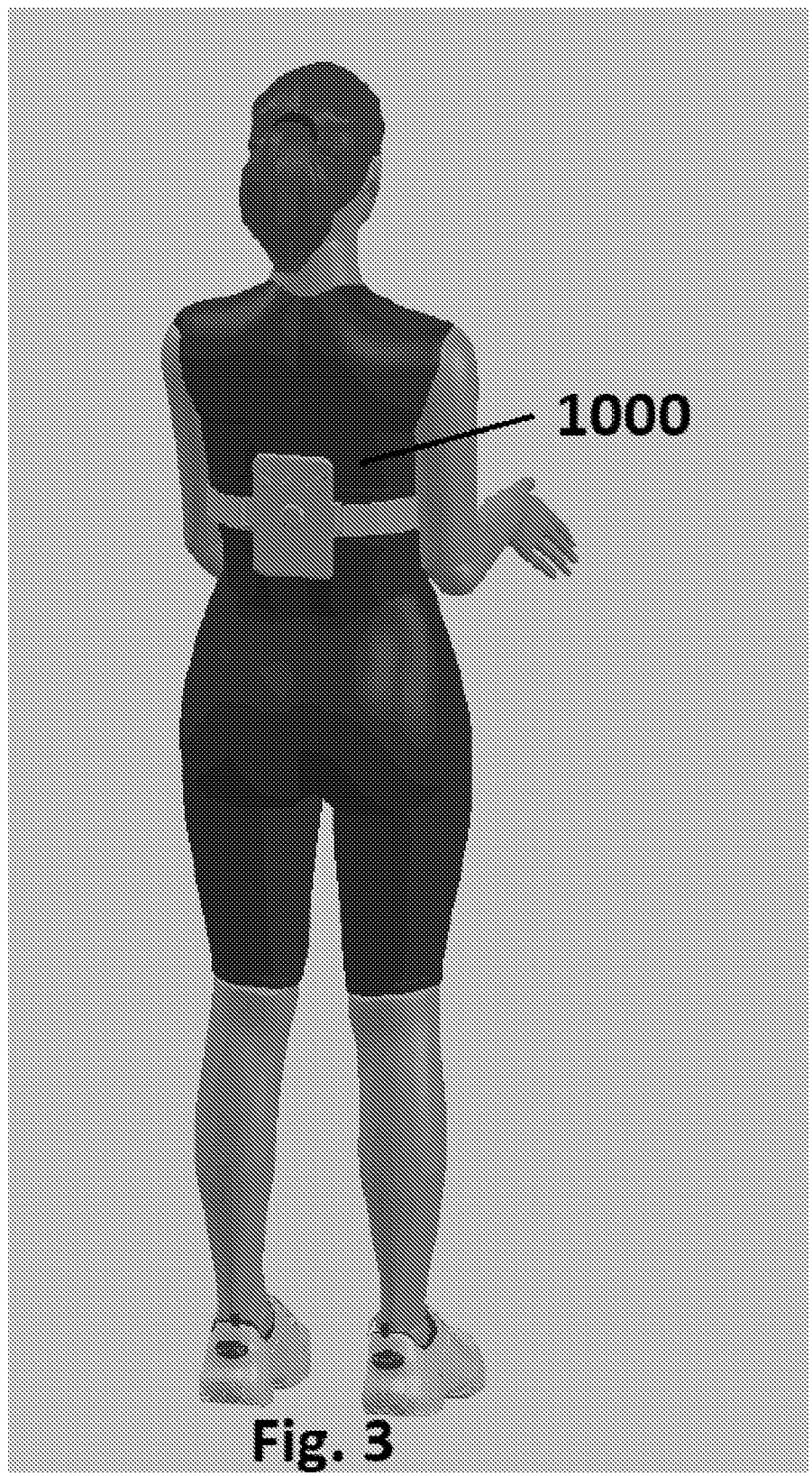
FIG. 3 shows a female user wearing the SIMS device using the chest belt option.
Figure 4:
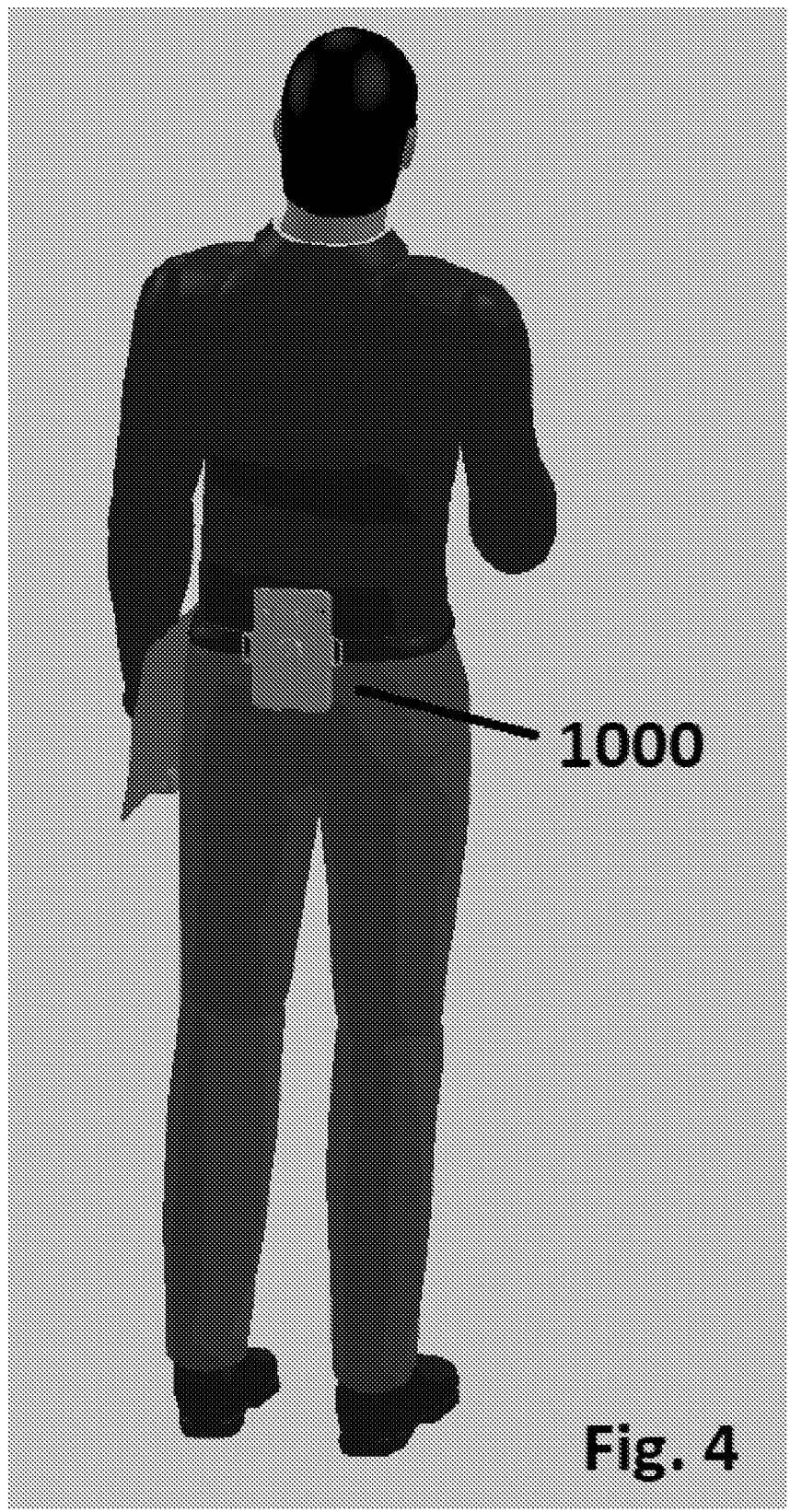
FIG. 4 shows a male user wearing the SIMS device using the belt clip option.

The two methods of wearing the SIMS device 1000 on the body are shown in FIGS. 3 and 4. FIG. 3 shows a woman wearing the SIMS device using a chest strap that wraps around her chest and is secured to the SIMS device using the body strap attachment points 55 shown previously in FIGS. 1 and 2. While the user wears the SIMS device and when it is powered on, it will provide continuous monitoring for any threats approaching the user from behind. The SIMS device 1000 may also be worn on the body by using the belt clip 50 located on the backside of the SIMS device to secure to a belt as demonstrated by the man wearing the SIMS device as shown in FIG. 4. It is recommended to only wear the SIMS device at waist height or higher in order to maximize the field of view that the camera will have when in use.

Figure 5:
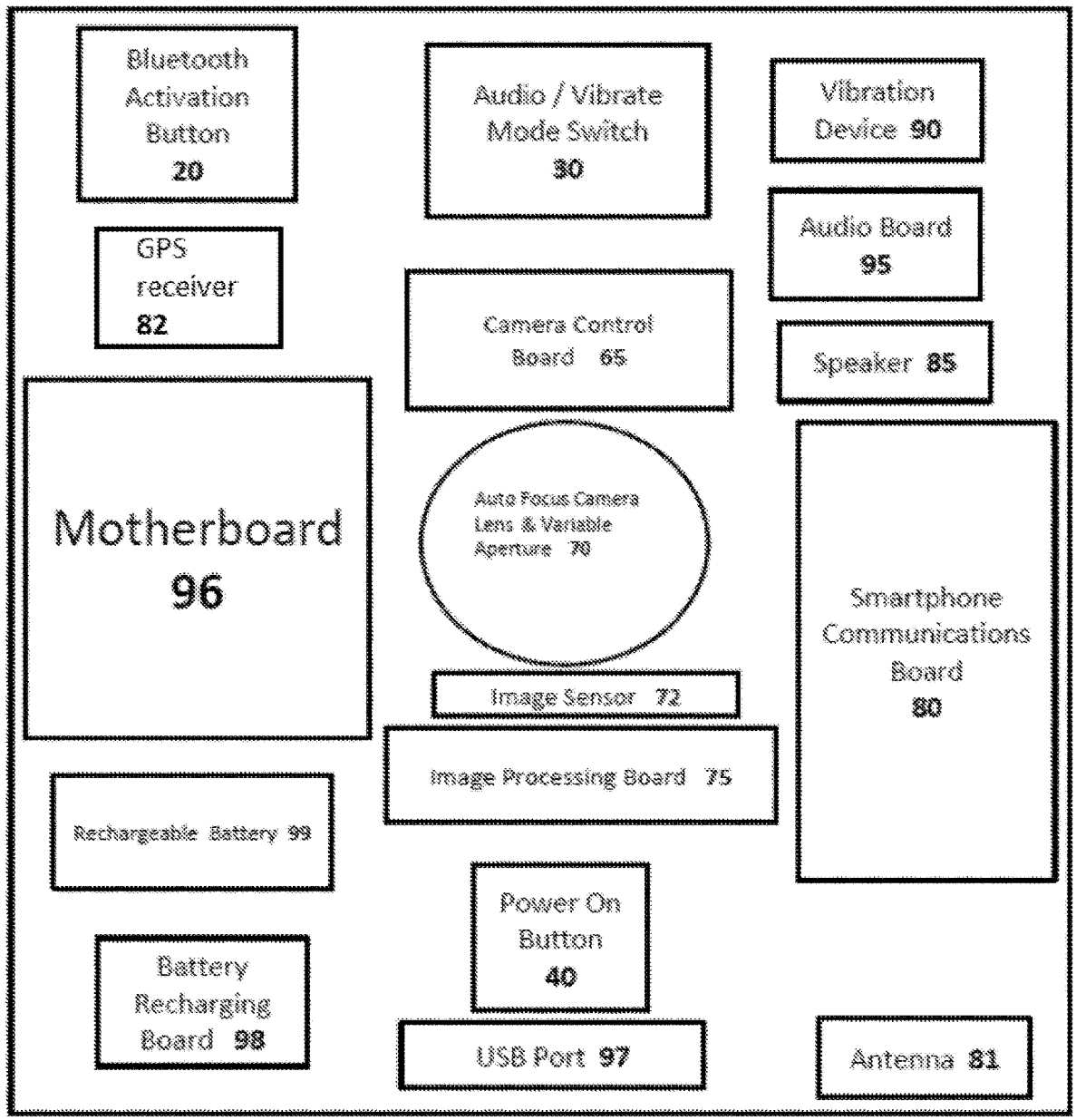
FIG. 5 is a component diagram of the SIMS device.
Figure 6:
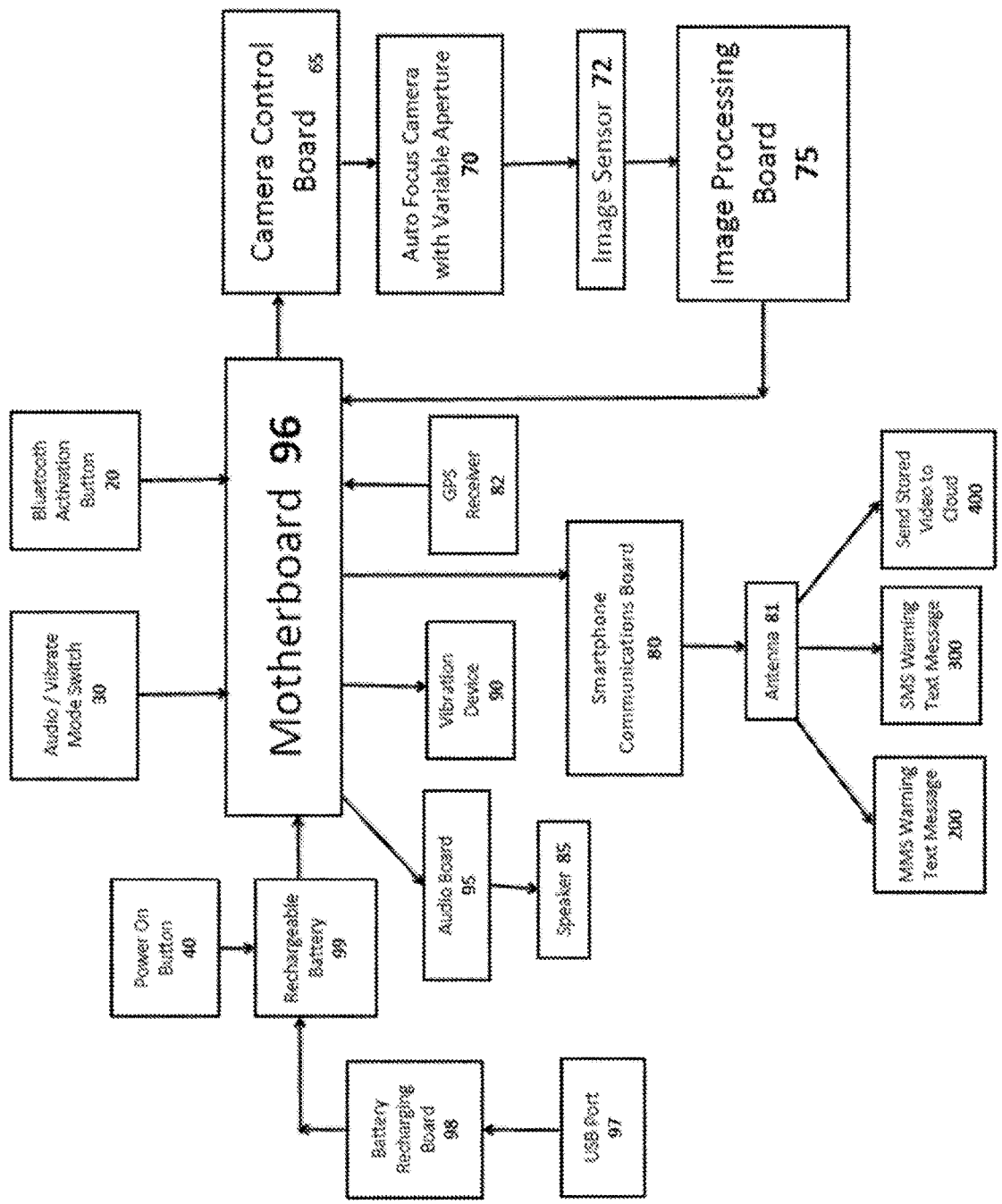
FIG. 6 is a functional block diagram showing the functional relationships of the various components of the SIMS device.

Referring next to FIGS. 5 and 6, the functional relationships of the various components that make the SIMS device 1000 shall next be explained. There are 16 essential components that comprise the SIMS device. These components are all shown in FIGS. 5 and 6 and are numbered for reference as follows:

Motherboard—96
Camera Control Board—65
Camera Lens and Variable Aperture—70
Image Sensor—72
Image Processing Board—75
Power On Button—40
Rechargeable Battery—99
Battery Recharging Board—98
USB Port—97
Audio Board—95
Speaker—85
Vibration Device—90
Smartphone Communications Board—80
Antenna—81
GPS Receiver—82
Audio/Vibrate Warning Mode Selector Switch—30
Bluetooth Activation Button—20

The motherboard 96 is the central control board that manages all of the operations of the SIMS device. The motherboard receives input from the audio/vibrate mode switch 30 and based on the input received will either warn the user of an approaching threat by either activating the audio board 95 or the vibration device 90. The motherboard is powered by a rechargeable battery 99 and also regulates the DC power inputs to all of the separate modules under its control. When the power on button 40 is pressed it allows DC power to flow from the rechargeable battery to the motherboard. When the Bluetooth activation button 20 is pressed it sends a signal to the motherboard to activate the smartphone communications board 80. Once the SIMS device is turned on, the motherboard activates the camera control board 65. A GPS receiver 82 continuously sends the device's location (latitude and longitude coordinates) to the motherboard while the SIMS device is operating. This GPS location data can later be used as part of the text of an SMS text detected threat warning message or included as part of an MMS text message that includes a picture showing the detected threat. In the case of the MMS text message, the GPS location data could be embedded as part of the picture sent so linked smartphone users can access the location of the SIMS user for assistance.

The camera control board 65 controls the operation of the auto focus camera with variable aperture 70. Based on the lighting conditions during use, the camera control board will regulate the aperture size to allow more or less light into the camera in order to obtain a sufficient contrast to process the images. Images are taken at a specified frame rate (images per second) and are focused onto the image sensor 72 which is preferably a charge-coupled device (CCD). The image sensor is composed of thousands or pixels (picture elements). The light from each picture image captured is converted to a digital signal representation by the image sensor and sent to the image processing board 75.

The image processing board 75 is the component of the SIMS device that performs the highly complex tasks of threat detection and monitoring. First, a human recognition detection algorithm is used to identify humans from the images. Once a human is identified, the human recognition detection (HRD) algorithm 500 will continuously track the identified human until it leaves the field of view of the camera. While humans are being tracked by HRD 500, a separate human to pixel count (HPC) image conversion algorithm 600 is used to count the total number of pixels that each detected human represents in each image processed. The pixel counts vary over time based on how far away the detected humans are from the SIMS device. Humans approaching the SIMS device will have increasing pixel counts over time and humans that move further away from the SIMS device will have decreasing pixel counts over time. The human pixel counts from the image processing board 75 are continuously tabulated and sent to the motherboard 96. These human pixel counts are then supplied as inputs to a threat determination (TD) algorithm 700 that is embedded firmware and is used by the motherboard 96. This novel method of detection of an approaching threat shall be explained in detail later in the specification.

The smartphone communications board 80 provides the capability of sending a warning message of a detected approaching threat to smartphones that have the SIMS device app installed. The smartphone user simply enables the SIMS device app by going into the smartphone settings and enabling the app. Once enabled, the smartphone app will use Bluetooth to connect the SIMS device to the user's smartphone.

The smartphone communications board 80 performs three independent functions. The first function is to send a Multimedia Messaging Service (MMS) picture and text message 200 showing the first image frame that is considered as a detected approaching threat by SIMS plus a short warning message. An example of a MMS text message 200 would be a text message such as "WARNING: SIMS DEVICE HAS DETECTED APPROACHING THREAT" followed by a picture showing the actual detected approaching threats. The second function is to send a Short Message Service (SMS) text message 300 which is only a text warning message without any pictures. A final function is the capability of sending stored video images from the memory of the motherboard 96 to the cloud. The SIMS user would enable these three functions as options that would displayed in the SIMS device app. Hardware to support the smartphone communications board includes an RF antenna 81 to transmit the data wirelessly to the selected SIMS enabled smartphones and also optionally to the cloud for secure video storage.

Another option in the SIMS device app is to allow the user to select a specific audio warning tone to use when the audio warning mode is enabled. The selected warning tone is then stored as an audio file in the motherboard and sent to the audio board 95 whenever a threat is detected. The audio board then sends the tone signal to the speaker 85 to play the sound. Yet another option in the SIMS device app is to allow the user to select the duration time and intensity of the vibration warning to use when the vibrate mode is enabled. The selected vibration time and intensity is then stored as a file in the motherboard's memory and is used to produce the desired vibration warning via the vibration device 90.

The USB port 97 is used for the recharging of the SIMS device whenever the rechargeable battery 99 level is low. The USB port interfaces with a battery recharging board 98 which is essentially a step down transformer that converts the DC voltage from the USB power to a lower voltage to charge the battery. Once the battery 99 has been fully charged, the battery recharging board 98 will switch off automatically to prevent overcharging.

Figure 7:
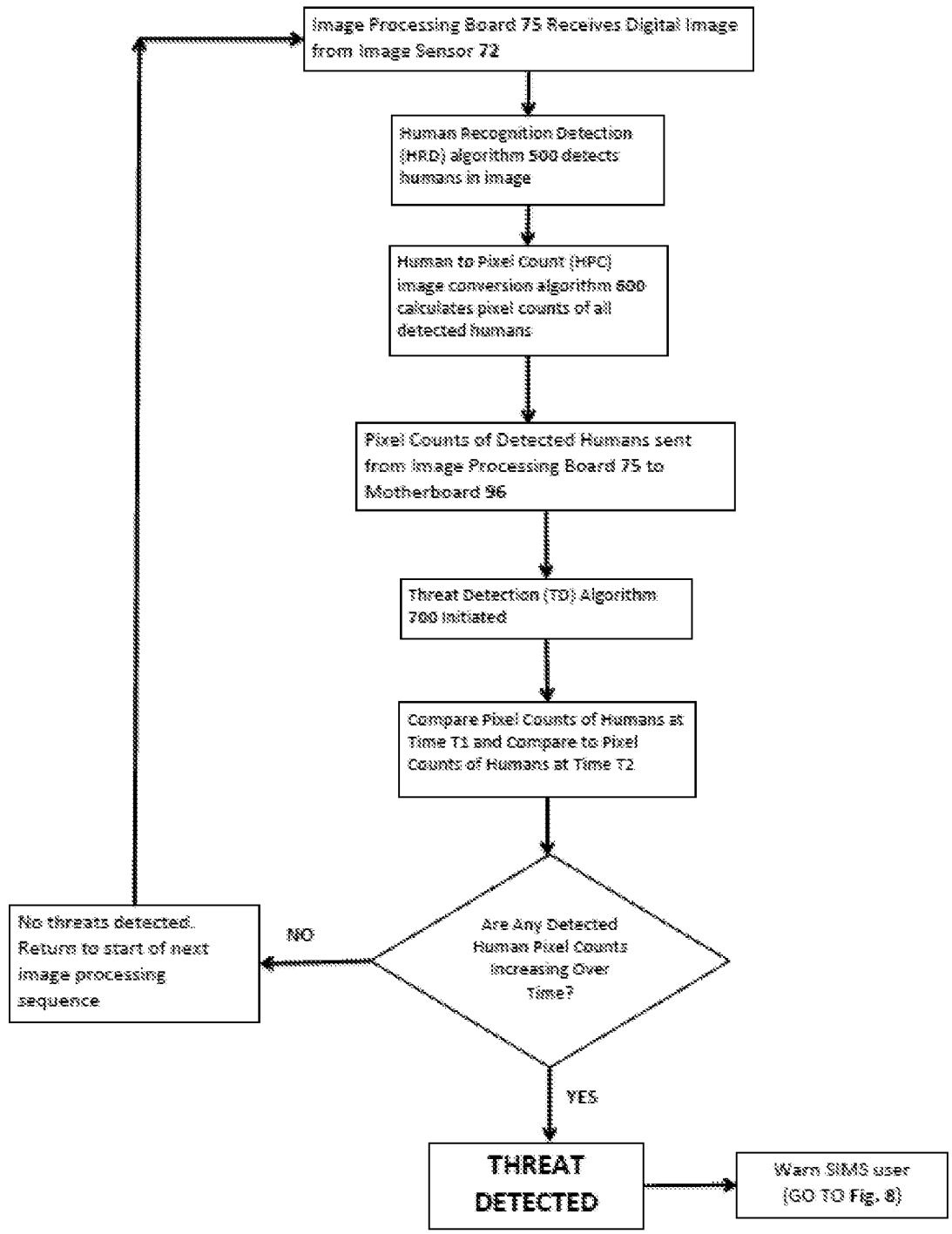
FIG. 7 is a flowchart showing how an approaching threat determination is made in the SIMS device.

Referring next to the flowchart shown in FIG. 7, the novel method of detection of an approaching threat using the SIMS device 1000 shall be explained in further detail. The SIMS device uses a novel method of threat detection that is far superior to prior art methods due to its ability to first recognize humans from digital camera images. First a human recognition detection (HRD) algorithm 500 scans the camera image file and identifies any humans. The details of how the HRD algorithm works are beyond the scope of this specification but would be known to one skilled in the art of artificial intelligence software code development. Next, a second algorithm defines a boundary around each detected human in the image and calculates the number of pixels inside each detected human boundary. This second algorithm is defined in this specification as a human to pixel count conversion (HPC) algorithm 600. The HPC algorithm 600 then sends the pixel count outputs of each detected human as inputs to a third threat detection (TD) algorithm 700 that is part of the embedded firmware in the motherboard 96. This TD algorithm 700 is continuously fed pixel counts for each detected human as each image is processed by the image processing board 75.

Referring again to FIG. 7, the TD algorithm 700 is always run whenever humans are detected by the SIMS device using the HRD algorithm 500. Pixel counts at a first time (T1) are then compared to pixel counts at a second later time (T2) and stored frame by frame in the motherboard's memory. The elapsed time (T2−T1) between image frames is determined by the frame rate of the camera 70. The SIMS device would preferably use a high frame rate camera (for example 1000 frames per second or 1000 fps) in order to achieve a fast detection time of an approaching threat. The TD algorithm then compares the pixel counts for each detected human over a short time interval (say 1 to 3 seconds for an outdoor exercise scenario) and determines if the pixel counts are increasing or decreasing. An increasing pixel count for any detected human is considered as a detected threat. If the pixel counts are all decreasing then the TD algorithm continues to monitor the next sequence of pixel counts received from the image processing board and the process continues this way in a continuous monitoring mode until the SIMS device is turned off.

Figure 8:
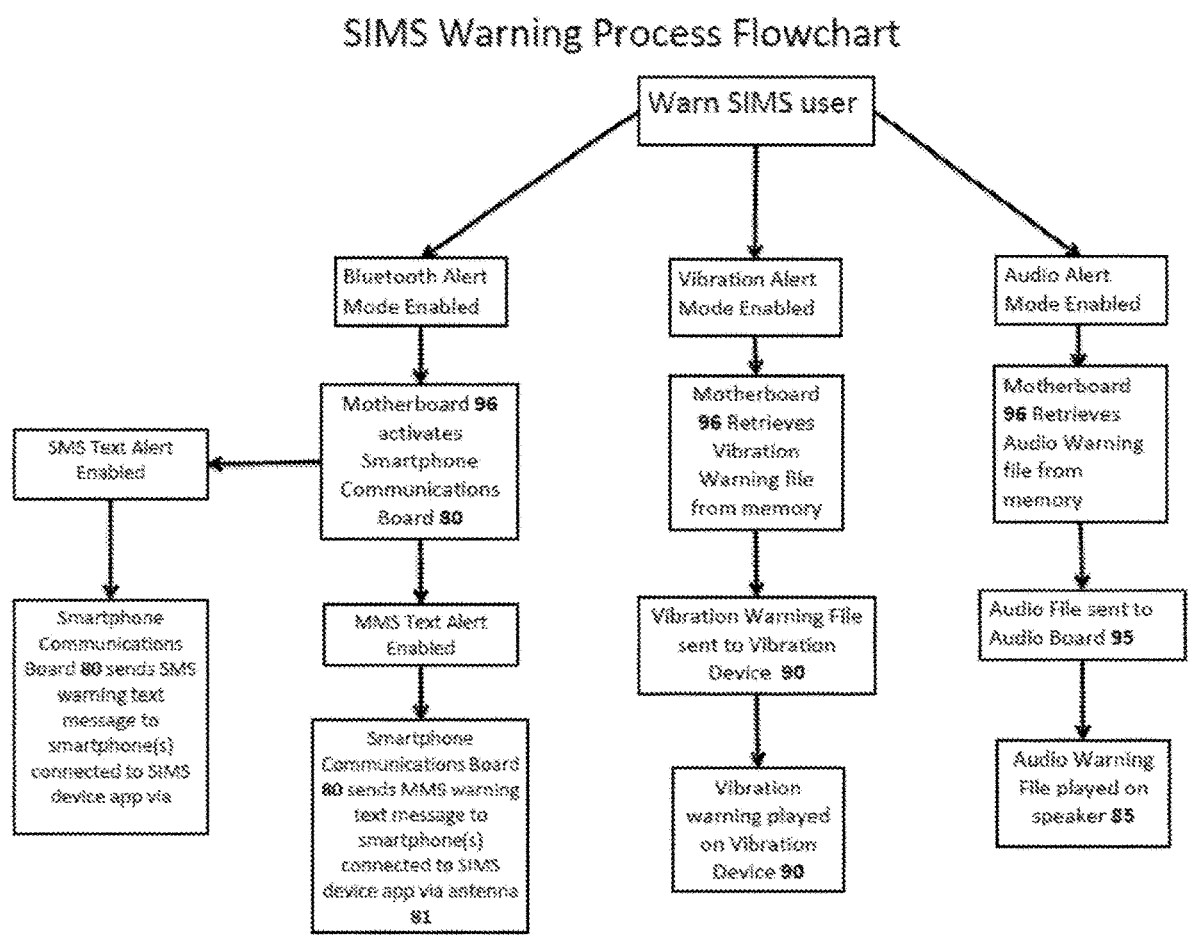
FIG. 8 is a flowchart showing the various warning methods that the SIMS device will use if an approaching threat from behind has been detected.

Referring next to FIG. 8, once a threat is detected, the SIMS device will take immediate action to warn the user. There are four possible methods of warning that can be used by SIMS. The first method is audio alert which plays a user selected audio warning tone from the speaker 85 driven by an audio board 95. The second method is vibration alert which vibrates the SIMS device using an internal vibration device 90 based on a user selected vibration file stored in the motherboard's memory. Enabling the Bluetooth mode on the SIMS device allows two additional alert methods that send either a Short Message Service (SMS) standard text only warning text message 300 or a Multimedia Messaging Service (MIMS) combined picture and text message that displays the same warning text message as SMS but adds a picture taken from the digital camera at the moment of first threat detection.

Referring finally to FIGS. 9 thru 11, an example scenario using the SIMS device to detect and count the pixel sizes of potential threats is shown. FIGS. 9(a), 9(b) and 9(c) shows three separate images taken at three second intervals of three joggers that are running behind a user wearing an activated SIMS device. Initially, all three joggers are running together (FIG. 9(a)) but by the final image (FIG. 9(c)) they have all been separated from each other. The HRD algorithm 500 has detected three humans in the images and for reference these detected humans are referred to as T1, T2 and T3. Next, FIGS. 10(a), 10(b) and 10(c) show the same time elapsed images that show the detected human image areas of T1, T2 and T3 that will be converted to pixel counts. Finally, the results of the HPC algorithm 600 are shown in FIG. 11. Note that the pixel counts only show one detected human (T1) to be an approaching threat as only the pixel counts of the detected human T1 were shown to be increasing over time. Based on this result the SIMS device would have alerted the user of an approaching threat.

The SIMS device 1000 provides a robust threat detection capability using a series of two image processing algorithms and a threat detection algorithm to provide a reliable and fast detection time as compared with prior art examples cited. Although the example shown was for a daytime scenario, other embodiments of the SIMS device would allow the SIMS device to be used for nighttime military patrol applications. In such nighttime applications for a military version of the SIMS device, the main difference in hardware would be the inclusion of a second infrared camera that could be deployed for nighttime approaching threat detection.

What is claimed is:

1. A device comprising:
    a housing, the housing comprising:
        a front portion, the front portion including a central camera lens; and
        a rear portion; and
    components enclosed in the housing, the components configured for surrounding intelligent motion sensing, the components comprising:
        a motherboard; and
        a memory,
    wherein the memory comprises a threat detection algorithm, the threat detection algorithm comprising:
        a human recognition detection algorithm that identifies humans from captured images;
        a human to pixel count conversion algorithm that defines a boundary region around each identified human in each captured image and converts a total number of pixels within each boundary region identified as humans in the captured images from the human recognition algorithm and represents the identified humans as a number of pixels for each captured image; and
        a threat determination algorithm that determines a threat condition based on an increase in number of pixels of the identified humans identified from the human recognition detection algorithm from an initial captured image to each subsequent captured image up to an Nth image over a time frame of 1 to 3 seconds,
    wherein the Nth captured image is the last captured image of said time frame.

2. The device of claim 1 wherein the housing further comprises a Universal Serial Bus (USB) port.

3. The device of claim 1, further comprising switches, the switches comprise one or more of a power on/off button, a Bluetooth activation button and a warning mode selection switch.

4. The device of claim 3 wherein the components comprise:
    a motherboard;
    a camera control board;
    an image processing board;
    a smartphone communications board; and
    a battery recharging board.

5. The device of claim 4 wherein the components further comprise:
    a GPS device;
    an audio device having a speaker;
    a vibration device;
    an image sensor; and
    an antenna.

6. The device of claim 5 wherein the motherboard is configured to receive input from the warning mode selection switch and based on the received input activating the audio device or the vibration device.

7. The device of claim 6 wherein the motherboard is configured to receive input from warning mode selection switch and based on the received input activating a notification.

8. The device of claim 7 wherein the motherboard is further configured to receive input from the activation button and activate the smartphone communications board in response.

9. The device of claim 8 wherein the GPS device continuously sends location information to the motherboard.

10. The device of claim 9 wherein the camera control board controls an operation of the central camera lens/variable aperture.

11. The device of claim 10 wherein the image processing board is configured to perform monitoring and determine threat detection.

12. The device of claim 11 wherein the smartphone communications board performs functions.

13. The device of claim 12 wherein the functions include one or more of sending a Multimedia Messaging Service (MMS) picture and text message showing a first image frame that is considered as a detected approaching threat, sending a Short Message Service (SMS) text message that is only a text warning message without any pictures, and sending stored video images from a memory of the motherboard to the remote server.

14. A wearable device for detection and warning of approaching threats from behind comprising:
- a housing comprising a front and a rear housing that mate together;
- a clip mechanism rigidly attached to the rear housing;
- slotted chest strap apertures located on the left and right sides of the housing;
- slotted sound projection apertures located on the front housing; and
- a motherboard within the housing configured to execute a threat detection algorithm to detect an approaching human threat and control an audio board, a vibration device, a communications board and a control board, wherein the threat detection algorithm comprises:
- a human recognition detection algorithm that identifies humans from captured images;
- a human to pixel count conversion algorithm that defines a boundary region around each identified human in each captured image and converts a total number of pixels within each boundary region identified as humans in the captured images from the human recognition algorithm and represents the identified humans as a number of pixels for each captured image; and
- a threat determination algorithm that determines a threat condition based on an increase in number of pixels of the identified humans identified from the human recognition detection algorithm from an initial captured image to each subsequent captured image up to an Nth image over a time frame of 1 to 3 seconds, wherein the Nth captured image is the last captured image of said time frame.

15. The wearable device of claim 14 wherein the audio board is configured to provide an audio warning tone to an internal speaker when activated by the motherboard.

16. The wearable device of claim 14 wherein the vibration device is configured to vibrate when activated by the motherboard.

17. The wearable device of claim 14 wherein the housing further comprises:
- a switch at the front face for selection of one or more of an audio based warning, a vibration warning for warning of an approaching threat;
- a button at the front of the device for activation of a wireless smartphone communication link; and
- a power on/off button.

18. The wearable device of claim 17 wherein the housing further comprises:
- a rechargeable battery;
- a battery recharging board for providing recharging of the rechargeable battery; and
- a USB port to supply Direct Current (DC) power to battery recharging board.

19. The wearable device of claim 18 wherein the housing further comprises:
- the communications board to send approaching threat warning messages to at least one linked smartphone;
- an antenna connected to the communications board for wireless transmission of SMS or MMS text messages to at least one linked smartphone;
- the control board for providing focusing and aperture control of a digital camera lens;
- a digital camera adjustable focus lens and variable aperture controlled by the camera control board;
- an image sensor using CCD (charge-coupled device) technology to receive focused images from the digital camera lens;
- a GPS receiver to send GPS location data of the device to the motherboard; and
- an image processing board that receives digital images from the image sensor.

* * * * *

UNITED STATES PATENT AND TRADEMARK OFFICE
CERTIFICATE OF CORRECTION

| | | |
|---|---|---|
| PATENT NO. | : 10,867,505 B2 | Page 1 of 1 |
| APPLICATION NO. | : 16/553258 | |
| DATED | : December 15, 2020 | |
| INVENTOR(S) | : Sean Michael Siembab and Caleb Neves | |

It is certified that error appears in the above-identified patent and that said Letters Patent is hereby corrected as shown below:

On the Title Page

Item (72) The inventors should list the following three inventors showing their city, state and country:

Sean Michael Siembab
Warren, Rhode Island
United States

Caleb Neves
Warren, Rhode Island
United States

Roger Henry Gagnon
Rockville, Maryland
United States

Signed and Sealed this
Twenty-seventh Day of August, 2024

Katherine Kelly Vidal
*Director of the United States Patent and Trademark Office*